(12) United States Patent
Yoshimura et al.

(10) Patent No.: US 6,888,472 B2
(45) Date of Patent: May 3, 2005

(54) PROGRAMMABLE TIMER UNIT FOR USE IN A REMOTE CONTROL LOAD MANAGEMENT SYSTEM

(75) Inventors: Yuichi Yoshimura, Tsu (JP); Toshiaki Tokizane, Tsu (JP); Kouji Yokota, Hisai (JP)

(73) Assignee: Matsushita Electric Works, Ltd., Kadoma (JP)

( * ) Notice: Subject to any disclaimer, the term of this patent is extended or adjusted under 35 U.S.C. 154(b) by 349 days.

(21) Appl. No.: 10/127,532

(22) Filed: Apr. 23, 2002

(65) Prior Publication Data

US 2002/0154652 A1 Oct. 24, 2002

(30) Foreign Application Priority Data

Apr. 24, 2001 (JP) ........................................ 2001-126762
Sep. 28, 2001 (JP) ........................................ 2001-302786

(51) Int. Cl.[7] ............................................. G05B 19/02
(52) U.S. Cl. ................................................ 340/825.22
(58) Field of Search .......................... 340/322, 825.22, 340/309.16, 310.01; 315/316, 291, 292, 312, 320; 700/9, 14

(56) References Cited

U.S. PATENT DOCUMENTS 4,956,826 A * 9/1990 Coyman et al. ............... 368/28
5,530,846 A * 6/1996 Strong ......................... 713/400
5,784,628 A * 7/1998 Reneris ....................... 713/300
6,137,192 A * 10/2000 Staffiere ...................... 307/130
6,166,619 A * 12/2000 Baiatu et al. ................. 338/61
6,331,756 B1 * 12/2001 Belliveau ..................... 315/316

FOREIGN PATENT DOCUMENTS

JP        2-144604        6/1990

OTHER PUBLICATIONS

Dynalite, An introduction to the dynalite control system, 2001, Dynalite Intelligent Light Pty Ltd, All Pages.*

* cited by examiner

Primary Examiner—Edwin C. Holloway, III
(74) Attorney, Agent, or Firm—Oblon, Spivak, McClelland, Maier & Neustadt, P.C.

(57) ABSTRACT

An improved programmable timer unit can be incorporated into a remote control management system to actuate loads according a user's defined schedule without relying upon any additional supplementary device for data communication. The timer unit includes an input section for selecting a switch address of any switch employed in the system and a schedule specifying the actuation time and the control code for actuation of the target load or loads. A processor makes up a load management program based upon the schedule and executes the program for control of loads. Thus, the timer unit can alone emulate any one of the switches for controlling loads without relying on additional external device for the data communication.

19 Claims, 13 Drawing Sheets

FIG. 9

| Program No. | Control Type | Control Code | On Time | Off Time | Interval | Designated Days |
|---|---|---|---|---|---|---|
| 1 | Normal | P2 | 8:30 | --:-- | ------ | Mon. Tue. Wed. Thu. Fri. SP-date 2 |
| 2 | Normal | P1 | 9:00 | --:-- | ------ | Mon. Tue. Wed. Thu. Fri. SP-date 2 |
| 3 | Repeat | P3 | 12:00 | 12:30 | 0h 30m | Mon. Tue. Wed. Thu. Fri. |
| 4 | Normal | P1 | 13:00 | --:-- | ------ | Mon. Tue. Wed. Thu. Fri. |
| 5 | Repeat | P2 | 18:00 | 19:00 | 1h 00m | Mon. Tue. Wed. Thu. Fri. |
| 6 | Repeat | P4 | 20:00 | 24:00 | 1h 00m | Mon. Tue. Wed. Thu. Fri. |
| 7 | Repeat | P4 | 7:00 | 24:00 | 1h 00m | Sat. Sun. SP-date 1 |
| 8 | Repeat | P4 | 12:00 | 24:00 | 1h 00m | SP-date 2 |
| ... | ... | ... | ... | ... | ... | ... |
| ... | ... | ... | ... | ... | ... | ... |

FIG. 10

| CONTROL CODE | LOAD GROUP | CONTROL METHOD |
|---|---|---|
| P1 | L1 | LAMP ON WITH 100% POWER |
| P2 | L1 | LAMP ON WITH 50% POWER |
| P3 | L1 | LAMP ON WITH 30% POWER |
| P4 | L1 | LAMP OFF |
| P5 | L2 | LAMP ON WITH 100% POWER |
| P6 | L2 | LAMP ON WITH 50% POWER |
| P7 | L2 | LAMP ON WITH 30% POWER |
| P8 | L2 | LAMP OFF |
| ... | ... | ... |
| ... | ... | ... |

PROGRAMMABLE TIMER UNIT FOR USE IN A REMOTE CONTROL LOAD MANAGEMENT SYSTEM

BACKGROUND OF THE INVENTION

1. Field of the Invention

The present invention relates to a programmable timer unit for use in a remote control load management system, such as for controlling the illumination loads according to a user's defined pattern or schedule.

2. Description of the Prior Art

A remote control load management system is widely utilized in the art for controlling the illumination loads. One such typical prior art system is shown in Japanese Patent Publication No. 2-144604, which is arranged to control the illumination loads connected to a common transmission line, and includes a programmable timer unit in order to turn on and off the illumination loads according to the user's defined schedule. The system basically includes a central controller, a switch terminal, and a load terminal that are connected with each other over the transmission line for a time-division multiplexing signal intercommunication therebetween. The switch terminal is equipped with one or more switches each of which is manipulated by a user for turning on and off one or more associated illumination loads, and with an intelligent module which is responsible for communicating with the central controller to send a command of actuating the illumination load or loads under the control of the central controller. The load terminal is connected to one or more loads and is also equipped with an intelligent module responsible for communicating with the central controller to receive the command of actuating the loads. For this purpose, the switch terminal is given a particular switch address allocated to the switch as well as a particular control code assigning an intended method for actuating the associated load or loads. The load terminal is also given a particular load address allocated to each load connected to the load terminal. The central controller stores an address table relating each of the switch addresses to one or more load addresses, as well as a control table relating each of the control codes to the control method for actuating the load or loads. In operation, as the switch is manipulated, the intelligent module of the switch terminal generates an event signal and transmit it to the central controller together with the switch address and the control code assigned to the switch. In response to the event signal, the central controller references the address table and the control table to obtain a destined load address and an intended control method, and provides a control signal indicative thereof to the load terminal, which responds to actuate the corresponding load in a manner as designated by the control method. The programmable timer unit included in the system has an input section for selecting a schedule specifying the target load, an actuation time for operating the load, as well as the control code for the load. Thus specified schedule is written into a load management program which is executed to give a timer signal to a dedicated intelligent terminal which in turn translates it into the command analogous to that issued from the switch terminal. Then, the command is sent from the dedicated intelligent terminal to the central controller in order to actuate the target load according to the schedule written in the load management program. The dedicated intelligent terminal is designed to have its own switch address which is analogous to that of the switch terminal and is set in most cases to be identical to the switch address in order to make the combination of the programmable timer unit and the dedicated intelligent terminal as an alternative of the switch. As the timer signal from the programmable timer unit is simply an ON/OFF signal as is generated by the switch in the switch terminal, the intelligent terminal has to be combined for generating the command to be capable of being interpreted at the central controller for actuating the target load.

However, since the dedicated intelligent terminal is allowed to have only a limited number of switch addresses, one or more additional intelligent terminals have to be connected to the programmable timer unit as the programmable timer unit is required to function as alternatives of more number of the switches for controlling a large number of the loads. This poses a problem of requiring an enlarged mounting space and an increased cost for satisfying more sophisticated load management.

SUMMARY OF THE INVENTION

In view of the above problem, the present invention has been achieved to provide an improved programmable timer unit for use in the existing remote control management system which is capable of actuating a large number of the loads according to a user's defined schedule without relying upon any additional supplementary device for communication with the central controller. The programmable timer unit of the present invention is adapted to be included in the existing system as discussed with reference to the prior art, and is provided in the form of a combination switch and timer that is used to determine anyone of the switch addresses defined in the address table of the central controller and to determine an actuation time at which the corresponding load is intended to be actuated in one of the control methods defined in the control table. To this end, the programmable timer unit includes an input section for selecting one of the switch addresses and for selecting a schedule specifying the actuation time and the control code for actuation of the target load or loads. Also included in the timer unit is a programming section that makes up a load management program based upon the schedule given at the input section, a memory for storing the load management program, a clock keeping time to give a present time, and a processor. The processor executes the load management program to generate the event signal and gives the control code when the present time coincident with the actuation time, then transmits the event signal, the control code, and the selected switch address to the central controller. Whereby, the central controller responds to actuate the corresponding load or loads in accordance with the schedule. In this sense, the programmable timer unit can alone emulate any one of the switches for controlling a large number of loads without relying on additional external communication devices for communication with the central controller.

Accordingly, it is a primary object of the present invention to provide the programmable timer unit which is capable of controlling a large number of loads, yet at reduced cost and space requirements.

The timer unit includes a transceiver section which is adapted to be connected to the transmission line for transmitting the event signal accompanied with the switch address and the control code to the central controller and for receiving therefrom a status signal indicative of a status of the load designated by the switch address. The timer unit has a single casing which accommodates electronic components realizing the input section, the programming section, the memory, the clock, the processor and the transceiver section. Thus, the timer unit can alone become an alternative to anyone of the switch terminals added with a timer capability simply by being connected to the existing system operating to manage a plurality of loads with a plurality of switch terminals.

In a preferred embodiment, the memory is designed to store a sunrise time and a sunset time specific to each of a plurality of predetermined regions. In this connection, the input section provides a menu for selecting one of the regions and for selecting one of the sunrise time and sunset time as the actuation time for the load. The sunrise and sunset times specific to the selected region are read from the memory by the processor which, in response to the present time coming coincident with the selected one of the sunrise and sunset times, generates the event signal for actuating the designated load. Thus, it is easy to manage the load in accordance with the solar schedule specific to the selected region. For the purpose of managing the load in precise match with a particular region, the input section is provided with a means for modifying the sunrise and sunset times The input section may be further provided with a function of accepting a request of a summer time adjustment. The memory stores a summer time range specifying a duration where a summer time is applied. When the summer time adjustment is requested, the processor modifies the present time given by the clock if the present time is within the summer time range for ensuring the load management in match with the summer time schedule.

Preferably, the input section includes a display for items to be selected at the entry of the schedule. The display is controlled by the processor so as to be deactivated after the elapse of a predetermined time period from the last action made at the input section, thereby saving energy.

In addition to the auto-off function of the display, the processor may activate the display upon detecting a presence of a user around the timer unit also in order to save energy for the display. For this purpose, the timer unit may include a human detector which provides a detection signal upon detecting the presence of the user around the timer unit such that the processor activates the display in response to the detection signal.

The input section may have a simulation means for accepting a simulation request for simulating the load management program, selecting the load management program to be simulated, and providing a simulation command. In response to the simulation command, the processor retrieves the actuation time from the program and temporarily sets the present time as the actuation time for executing the load management program. Thus, the user can easily simulate the load management schedule simply by selecting the program at the input section.

Further, the input section may include a function of allocating the load management program to a specific day such as a holiday or half-holiday. Also included in the input section is a specific day selecting key which issues an instant selection command designating the next date as the specific day. In response to the instant selection command, the processor modifies the load management program to include the next date for making the load management in accordance with the load management program allocated to the specific day.

The programmable timer unit is preferably designed to have a time signal input terminal circuit for receiving a time signal being counted at an external device such a real time signal distributed via the transmission line, and a time signal output terminal for passing the time signal to another programmable timer unit connected through the transmission line. A synchronous time correction means is included in the timer unit to correct the present time in accordance with the time signal so that the timer unit can make the load management reliably on a real-time basis. In order to protect the timer unit from an overcurret circuit hazard which would occur in transmitting the time signal if the line should be accidentally shorted, the timer unit may include a current limiter which limits a current responsible for transmitting the time signal to the transmission line.

The timer unit may include a time signal detection means which detects whether or not the time signal is transmitted from the time signal output terminal, and indicates the detection result on the display for the purpose of acknowledging the safe output of the time signal.

The programmable timer unit may further include a back-up power circuit which keeps energizing the clock in the absence of the power supplied from an external power source. In this connection, the timer unit includes a check means for checking whether or not the back-up battery provides a sufficient power for operating the clock and warning if the sufficient power is not available, thereby keeping the reliable operation of the timer unit.

Further, the timer may be additionally provided with a data communication means which obtains an externally prepared load management program through the transmission line and stores it in the memory, which enables the use of the program prepared at the external device or computer when so required to facilitate the designing of the load management. In order to utilize the external program, the timer unit may be given an initializing function of erasing the load management program stored in the memory. In this connection, the timer unit may be given a copying function of duplicating the load management program for preparing another program simply by modifying the already stored program. The timer unit may further include an error processing means which gives an error message on the display when the load management program fails to operate. The memory is preferred to be a non-volatile memory.

These and still other objects and advantageous features of the present invention will become apparent from the following description of the preferred embodiment when taken in conjunction with the attached drawings.

BRIEF DESCRIPTION OF THE DRAWINGS

FIG. 9 is a table illustrating properties and methods of various programs stored in the above timer unit;

FIG. 10 is a table illustrating information designated by various control codes utilized in the above timer unit;

DESCRIPTION OF THE PREFERRED EMBODIMENT

Figure 1:
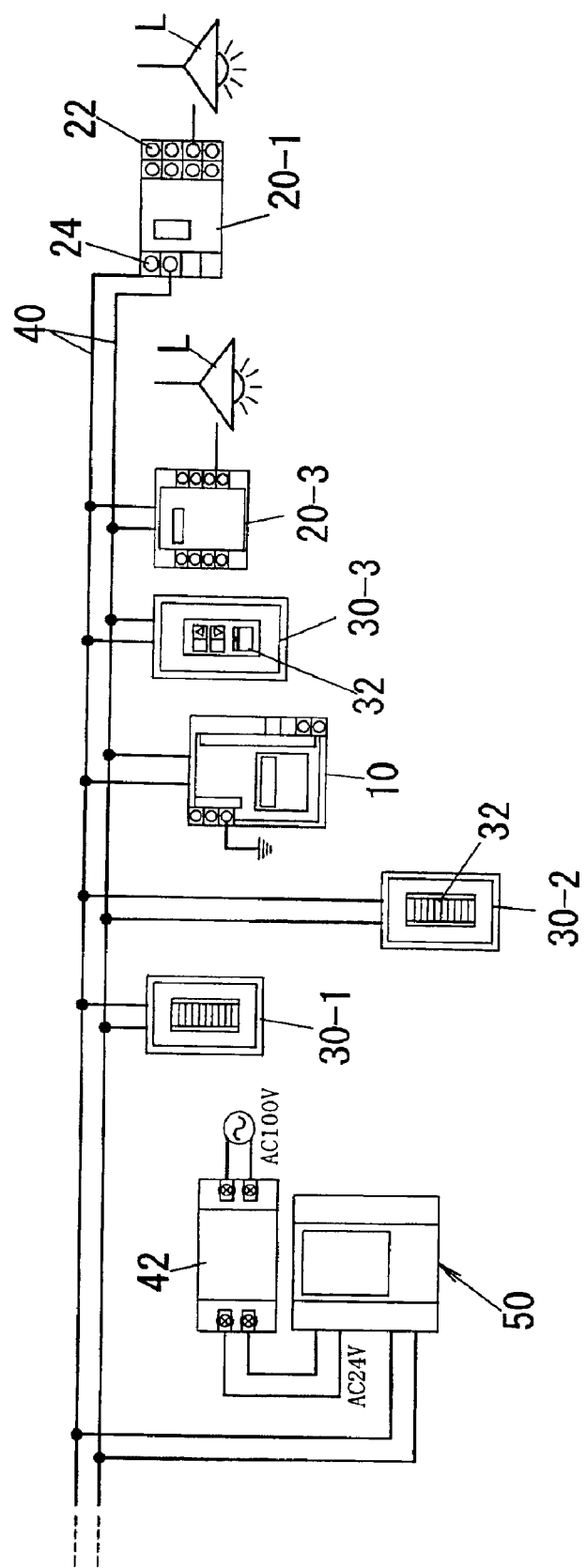
FIG. 1 is a schematic view illustrating a remote controlled load management system which accommodates a programmable timer unit in accordance with a preferred embodiment of the present invention.

Referring to FIG. 1, there is shown a remote control load management system equipped with a programmable timer unit 50 in accordance with a preferred embodiment of the present invention. The timer unit is added to the system for controlling loads, for instance, illumination loads or lamps L according to a user's defined time schedule. Basically, the system includes a central controller 10, a plurality of load terminals 20-1 and 20-3, and a plurality of switch terminals 30-1, 30-2, 30-3 which are connected for intercommunication with each other through a two-wire transmission line 40. The load terminals 20-1 and 20-3 include two types, one 20-1 being a normal type for turning on and off the lamps, and the other 20-3 being a dimmer type capable of dimming the lamps L.

Each of the load terminals 20-1 and 20-3 is provided with load ports 22 for connection with up to four lamps L and with a line port 24 for connection with the transmission line 40. Each load terminal includes an intelligent section having load addresses respectively allocated to the load port, i.e., the load connected thereto, and includes relays for turning on and off the loads in response to a command transmitted from the central controller 10. The load terminal 20-3 of the dimmer type is added with a dimmer which provides a dimmer command for varying illumination power being fed to the lamp L also in response to the command from the central controller 10. Further, each load terminal is given a function of transmitting back to the central controller a status signal indicative of a condition of the lamp.

The switch terminals include three types, one being a normal type 30-1 for turning on and off the associated lamps individually, another being a pattern type 30-2 for turning on and off a group of the lamps in accordance with a predetermined pattern, and the rest 30-3 being a dimmer type for dimming the lamp. The switch terminal 30-2 of the pattern type is utilized to actuate according to a selected pattern of control for the lamps. For this purpose, the switch terminal of this type is associated with the selected lamps and the selected control method. Such relation is stored in the central controller 10. Each of the switch terminals includes at least one switch 32 which is given an individual switch addresses which is associated with one or more loads, i.e., the load addresses at the central controller 10 such that the load or the loads are actuated by the manipulation of the switch. That is, each switch terminal has an intelligent function of transmitting an event signal indicative of the switch being manipulated followed by the switch address of the switch and a particular one of control codes assigned to the switch as indicative of the manner of actuating the lamp or lamps. Hereinafter, the load terminals and the switch terminals will be collectively referenced simply by numerals 20 and 30, respectively unless required to indicate the particular type.

Figure 5:
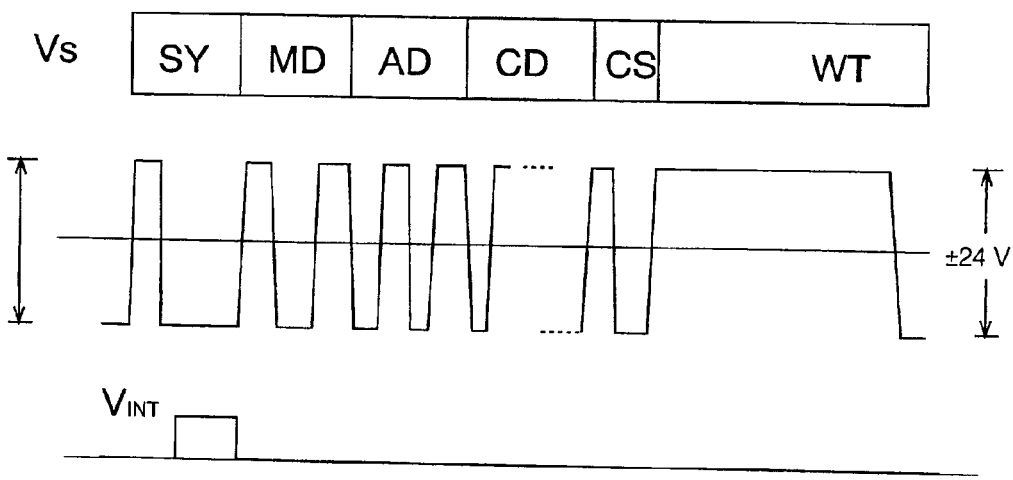
FIG. 5 is a waveform chart illustrating a signal transmitted in the above system.

The central controller 10 which governs the whole operation of the system and has an address table which relating each of the switch addresses to at least one load address, and a control table relating each of the control codes to a control method for operating the lamp or lamps. The central controller 10 generates and regularly transmits a time division multiplex signal Vs to the switch terminals 30 and the load terminals 20 via the transmission line 40. As shown in FIG. 5, the signal Vs is a pulse modulated signal having an amplitude of ±24V and is composed of a synchronous sign SY indicative of a start of the signal, a mode data MD describing a mode of controlling the load terminal or the switch terminal, an address data AD describing an address designating the lamp and the switch, a control data CD describing the control method a check sum data CS for checking a transmission error, and a response waiting slot WT for receiving a response from the switch terminal or the load terminal. The mode data MD includes a control mode for controlling the lamp or lamps, a polling mode, a polling-interrupted mode initiated by the manipulation of the switch, i.e., the event signal from the switch terminal, and a supervision mode for supervising the status of the lamp or lamps.

When the address data AD is acknowledged to coincide with its own address, the switch terminal 30 or the load terminal 20 responds to operate in a manner when required in the control data CD and to send back a response signal within the response waiting slot WT when so required. The response signal is responsible for transmitting the switch or load address, the control code, and the status information of the switch or the lamp, and is realized by a level-shifted signal which is a combination of high and low current level appearing between the two wires of the transmission line.

In operation, the central controller 10 is normally set into the polling mode to query whether any one of the switch terminals 30 issues the event signal as a result of the switch being manipulated. The event signal is issued from the switch terminal as an interruption signal Vint in synchronous with the synchronous sign SY at the start of the signal Vs, as shown in FIG. 5. At this condition, the switch terminal 30 sets an interruption flag so as to be prepared for data transfer to and from the central controller 10. Upon acknowledgement of the interruption signal Vint or the event signal from the switch terminal 30, the central controller 10 comes into the polling-interrupted mode in order to receive the switch address issuing the event signal as well as the control code within the response waiting slot WT. After receiving the switch address, the central controller 10 references the address table to locate the load address of the destined lamp or loads associated with the switch address. Then, the central controller 10 is set into the supervision mode in order to inquire the status of the destined lamp. In this response, the load terminal 20 connected to the destined lamp or lamps sends back the status information of the lamp to the central controller 10 which in turn transmits a confirmation signal to the switch terminal 30 and references the control table with the help of the status information of the lamp so as to obtain the control method as intended by the control code for operating the lamp. Then, the central controller 10 transmits a control signal indicative of the load address and the control method to the corresponding load terminal 20 in order to actuate the lamp L in the manner defined by the control method. Thereafter, the load terminal 20 sends a signal indicating the result of the control, thereby completing the requested control initiated by the event signal from the switch terminal 30.

Figure 2:
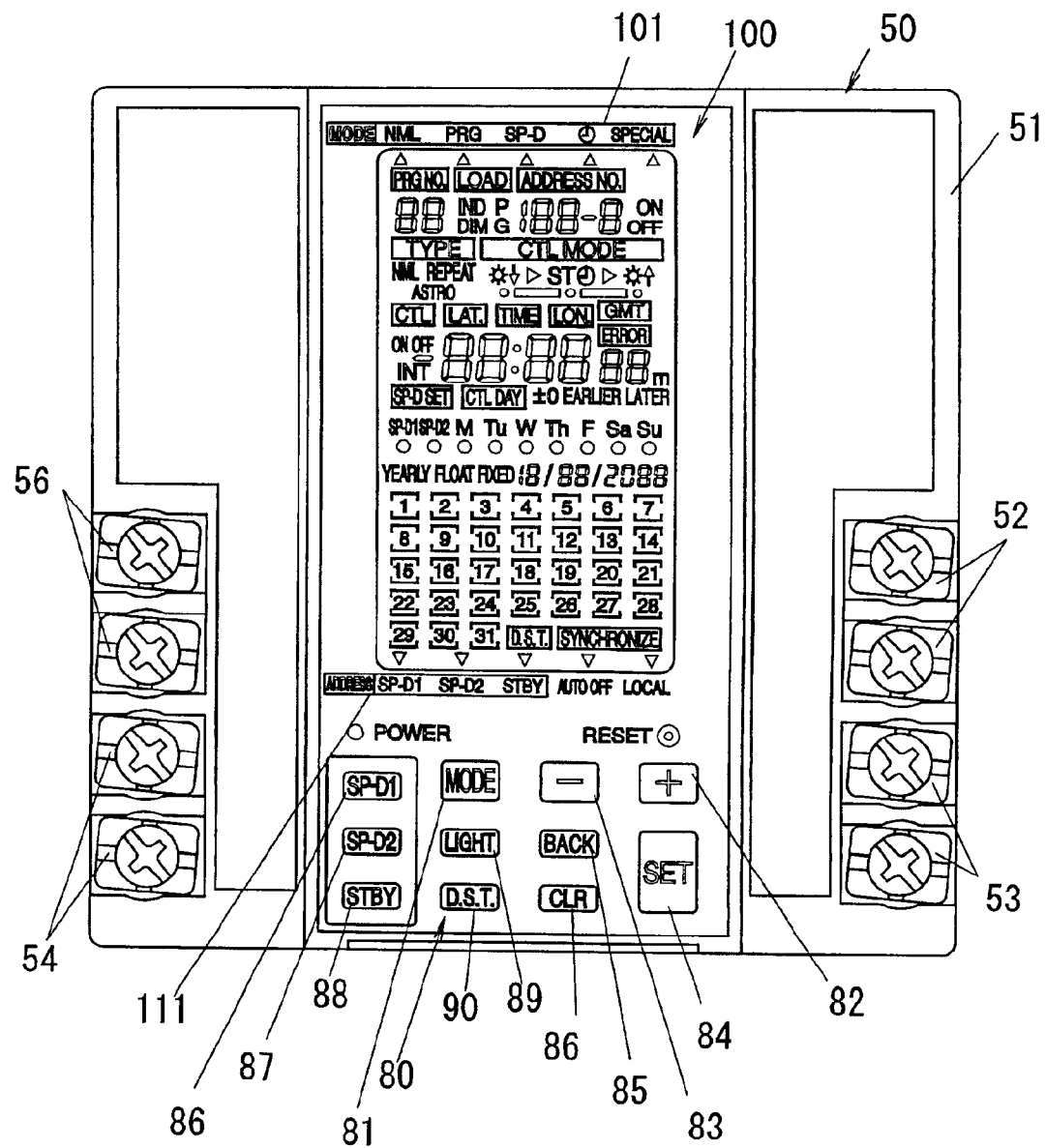
FIG. 2 is a front view of the above programmable timer unit.
Figure 4:
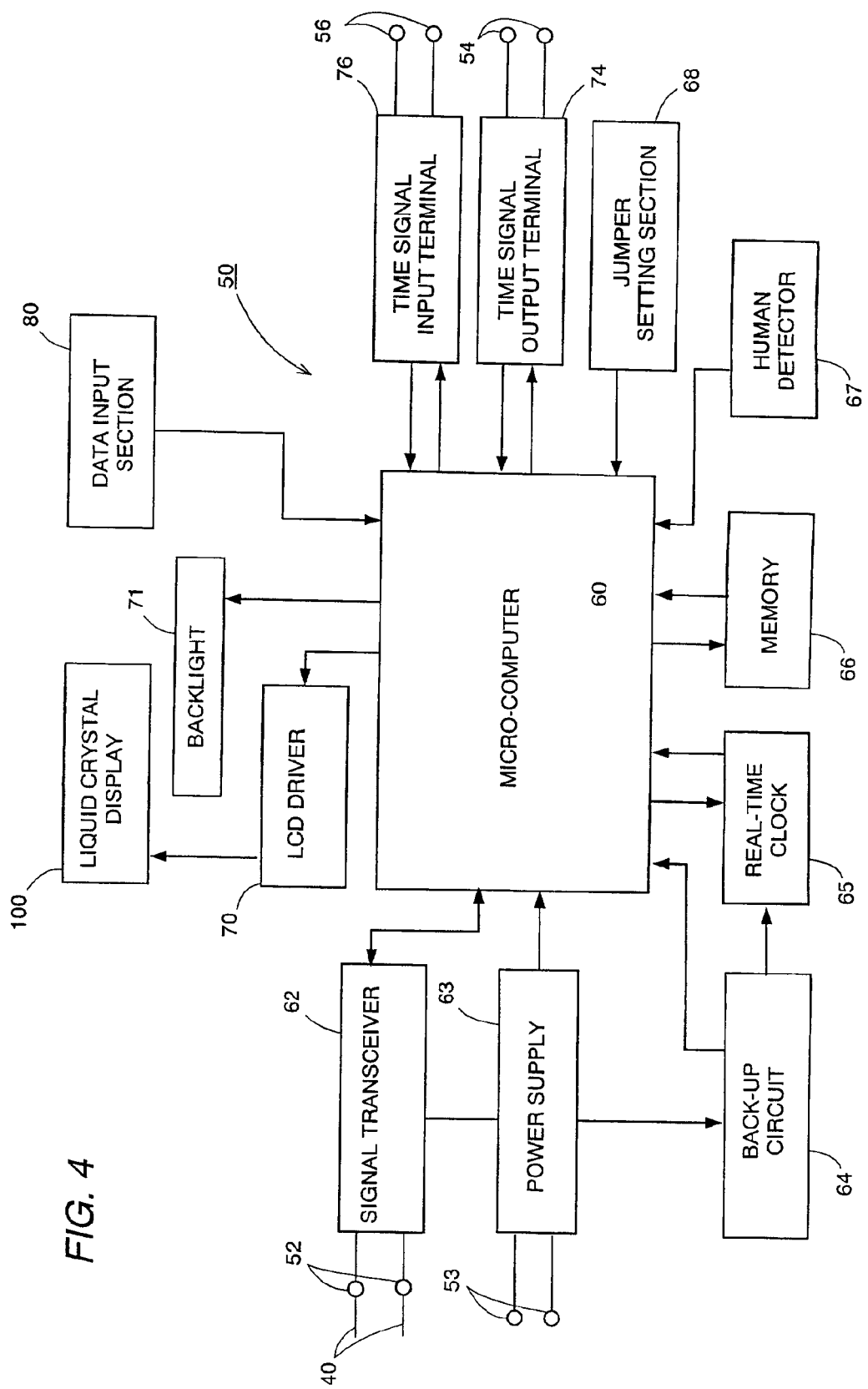
FIG. 4 is a block diagram illustrating an internal circuit of the above timer unit.

As shown in FIG. 2, the programmable timer unit 50 has a single housing 51 which incorporates all the electronic components forming a variety of functional blocks. As shown in FIG. 4, the functional blocks include a microcomputer 60, a signal transceiver 62 for intercommunication with the central controller 10 via the transmission line 40, a power supply 63 providing an operating voltage from an external voltage source 42, a back-up power circuit 64, a real-time clock 65, a non-volatile memory 66, a human detector 67, a jumper setting section 68, a time signal output terminal circuit 74, a time signal input terminal circuit 76, a data input section 80, a liquid crystal display 100, an LCD driver 70, and a backlight 71. The signal transceiver 62 is connected to the transmission line by means of screw terminals 52 on the front face of the housing 51. Also, the power supply 63 is connected to the external voltage source by means of screw terminals 53 on front face of the housing 51. The housing 51 is further provided with screw terminals 54 and 56 respectively for connecting the time signal output terminal circuit 74 to another timer unit and for connecting the time signal input terminal circuit 76 to an external device to be supplied with a real time clock signal therefrom, as will be discussed later.

The programmable timer unit 50 of the present invention is analogous to a combination of a timer and the switch terminal and is characterized to act as a multiplicity of switch terminals. In other words, the timer unit 50 can alone perform as many as the switching operations to control as many as the lamps in accordance with a user's defined time schedule. For this purpose, the input section 80 allows the user to select a suitable number of the switch addresses defined in the address table of the central controller 10 such that the timer unit 50 can be anyone of the switch terminals 20 added with the timer capability. For each selected switch address, the input section 80 enables to select an actuation time at which the corresponding load is intended to be actuated and the control method for actuating the load, i.e., a schedule specifying the actuation time and the control method or control code for the lamp or lamps L. The microcomputer 60 includes a programming section which makes up a load management program based upon thus entered schedule and stores the program in the memory 66. Also included in the microcomputer 60 is a processor which reads and executes the load management program to generate the event signal and give the control code when the present time counted at the clock 65 coincides with the actuation time, and transmits the event signal, the control code, and the selected switch address to the central controller 10 such that the central controller responds to actuate the corresponding lamp or lamps in accordance with the schedule.

Operation of the Timer Unit

Figure 3:
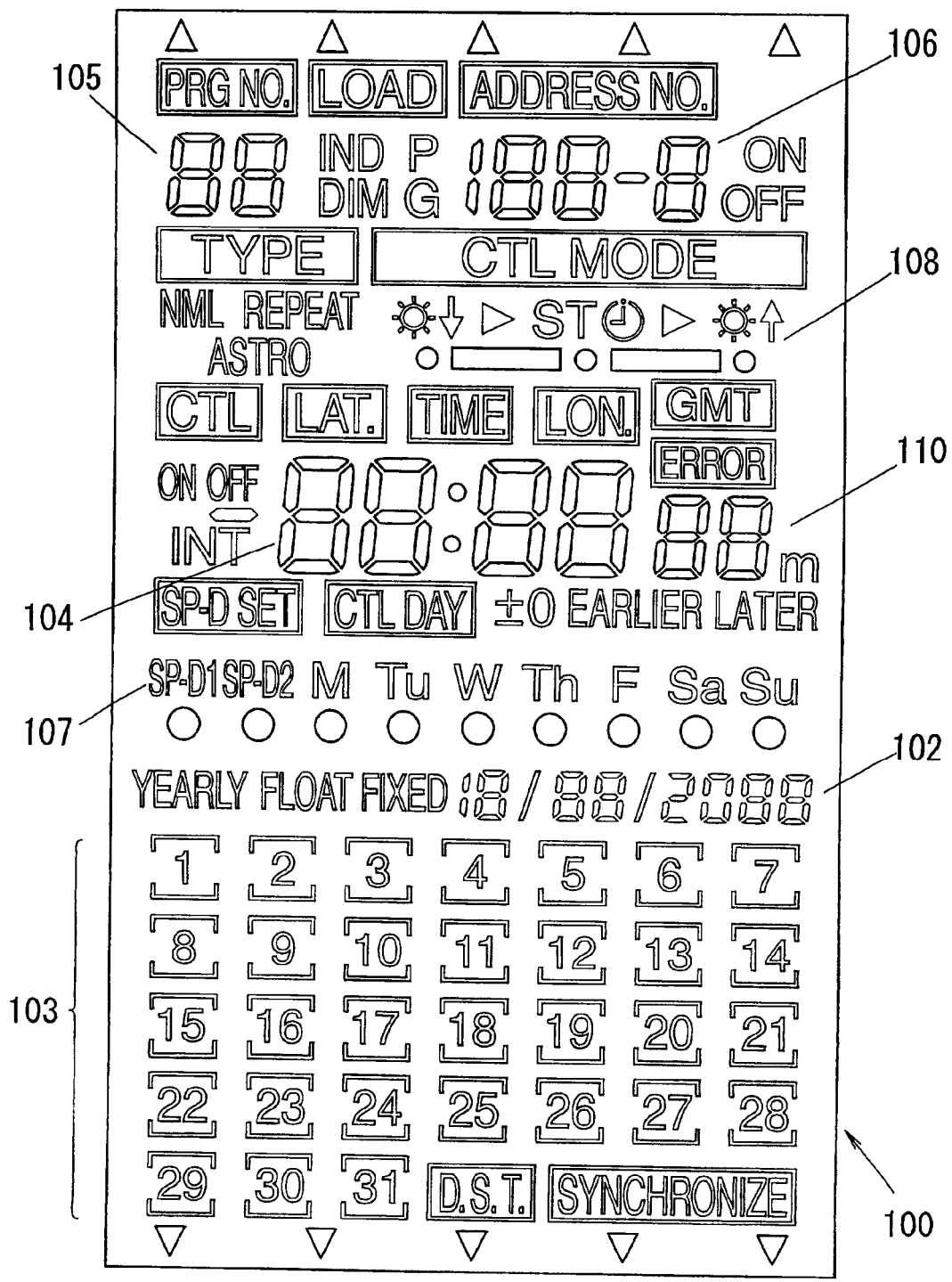
FIG. 3 is a front view of a major portion of a display of the above timer unit.
Figure 6:
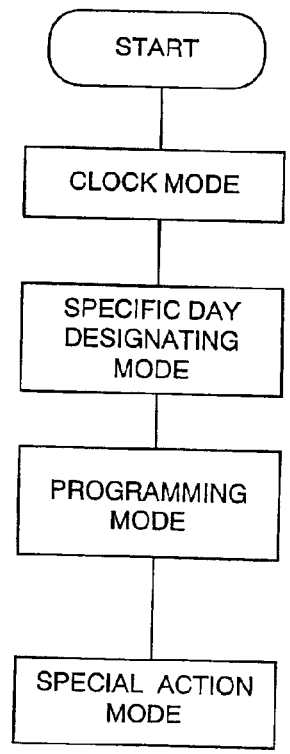
FIG. 6 is a flow chart illustrating various modes to be selected when the timer unit is firstly installed.

Now, with reference to FIGS. 2 and 3, the feature of the timer unit 50 will be discussed in connection with the input section 80. As shown in FIG. 2, the input section 80 has a mode selection key 81 which selects a normal mode (NML), a programming mode (PRG), a specific day setting mode (SP-D), a clock mode, and a special action setting mode (SPECIAL) in this sequence each time the key 81 is pressed, as shown in FIG. 6. The selection is confirmed by corresponding markings or icon highlighted at the uppermost row 101 of the display 100, as shown in FIG. 2.

1) Normal Mode

When the normal mode is selected after the clock mode, the programming mode and optionally the other modes are fulfilled as discussed hereinafter, the timer unit 50 becomes responsible for controlling the lamps in the user's defined schedule.

2) Clock Mode

When installed first, the clock mode has to be selected for entry of a present day and time. The clock mode prompts the user to proceed the steps of entering year, month, day, and time in this order. The year, month and day are selected by pressing an up-key 82 and a down-key 83 while referencing a date windows 102 and an one month calendar 103 of the display 101, and fixed by pressing a set-key 84. The present time is likewise selected by using the keys 82, 83 and 84 with reference to a time window 104. Also included in the input section 80 are a back-key 85 for moving back one step within the clock mode. After finishing the clock mode, the day of the week is automatically assigned to the present day thus determined with reference to an internal calendar provided by the microcomputer 60.

3) Specific Day Setting Mode

Then, the mode selection key 81 is pressed to select the specific day setting mode for entry of two specific days such as a holiday, a half-holiday, and a particular event day. When this mode is selected, a corresponding marking "SP-D SET" and one of marking "SP-D1" or "SP-D2", and one month calendar 103 are highlighted for prompting the user to select the two specific days by using the keys 82, 83 and 84. After selecting each specific day, it is requested to validate the specific day as applicable to every year ("YEARLY"), to the present and next year ("FLOATING") only, or to a particular year ("FIXED") which are indicated by respective markings adjacent to the date window 102. By using the up-key 82 and down-key 83 and the set key 84, the applicable year is determined and stored in the memory 66.

4) Programming Mode

Figure 7:
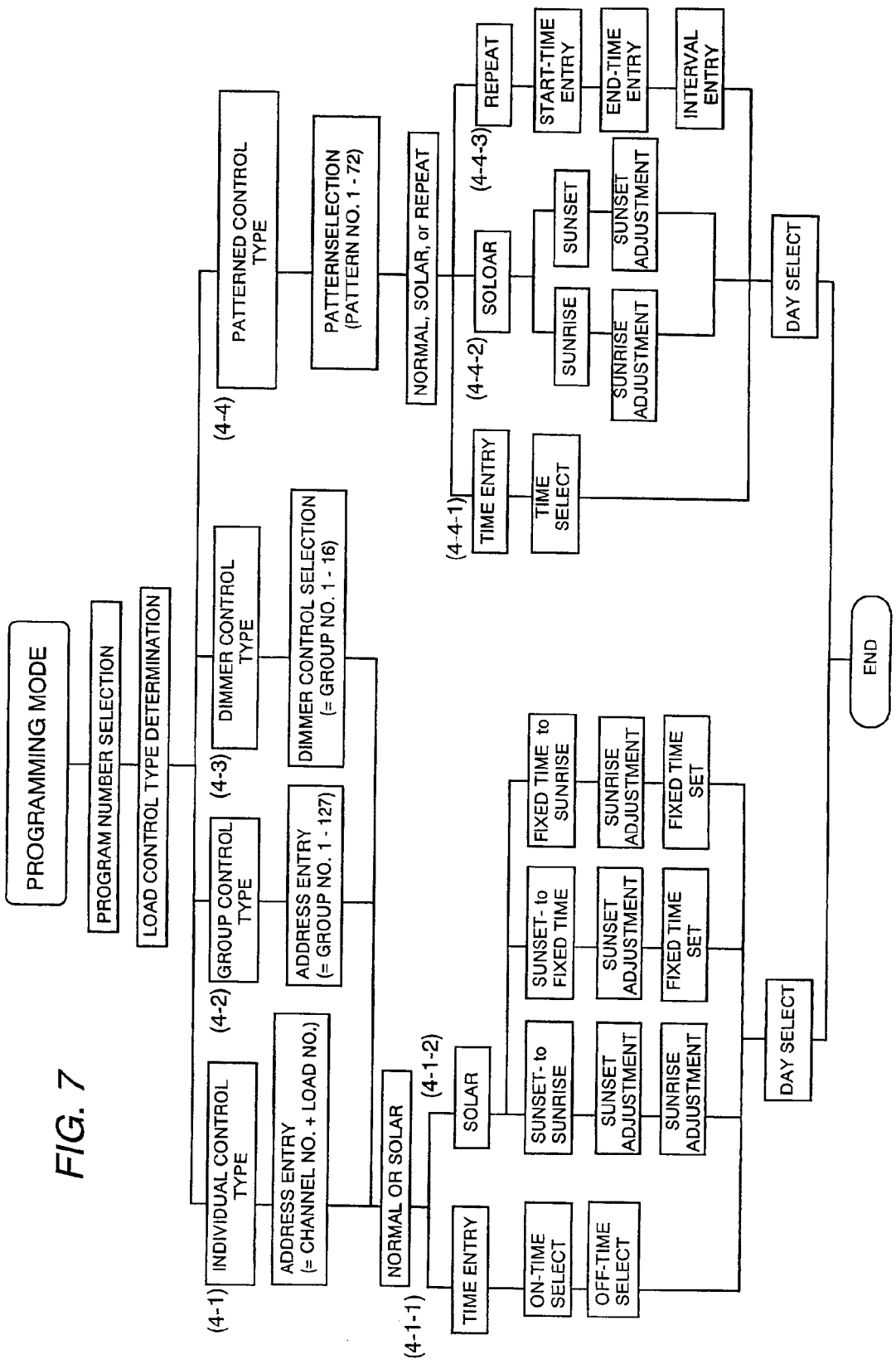
FIG. 7 is a flow chart illustrating a sequence of a programming mode.
Figure 8:
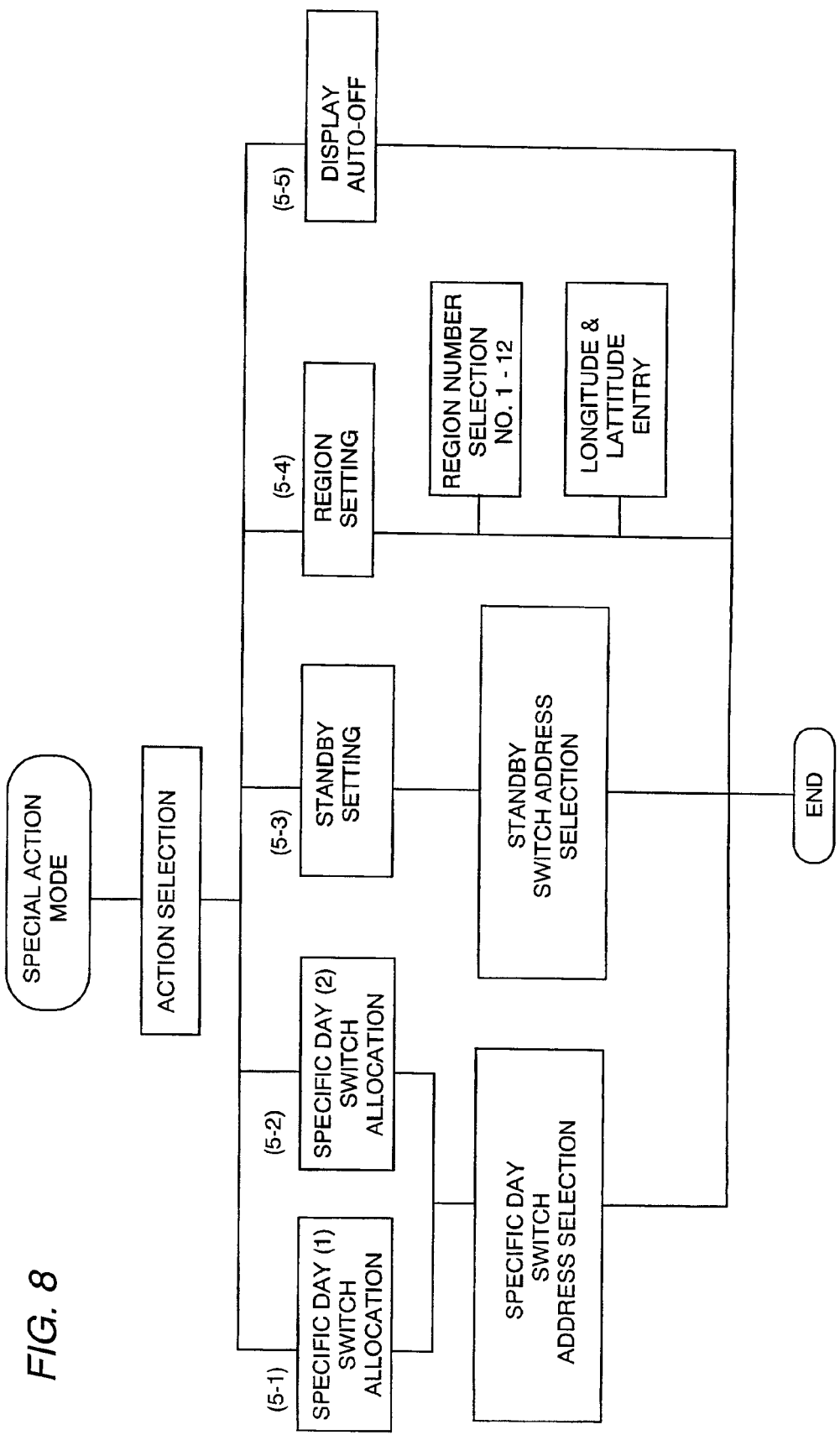
FIG. 8 is a flow chart illustrating a sequence of a special action mode.

When the programming mode is selected with the marking "PRG being highlighted, a seven-segments program number display 105 gives a program number immediately below a markings "PROG NO."also being highlighted at the upper end of the display. The program number starts with "1", which is a default number, and counts up to "30" as the timer unit 50 can store up to thirty programs in the memory. After selecting the program number 453 by pressing the keys 82 to 84, the sequence proceeds to a load control type determination step for determining one of "individual control type", "group control type", "dimmer control type", and a "patterned control type", as shown in FIG. 7. The "individual control type" is for controlling to turn on and off the lamps individually, i.e., one by one, while the "group control type" is for controlling to simultaneously turn on and off a plurality of the lamps classified into one group. The "dimmer control type" is for controlling the dimming ratio or power ratio with regard to a predetermined group of the lamps having a dimming capability and being connected to the load terminal 20-3 of the dimmer type. The "patterned control type" is for controlling the lamps in accordance with in one of predetermined patterns which are already programmed in the central controller 10 to specify different control methods of operating the lamps. The control methods include, for example, one for lighting the lamps in one group at a full-power ratio or a reduced power ratio until the other control method is designated. Seventy-two (72) predetermined patters are stored in the central controller 10 and can be identified by the number selected at the timer unit 50.

4-1) "Individual Control Type"

When this type is selected, the corresponding marking "IND" is highlighted adjacent to the program number display 105 and a sequence proceeds to prompt the entry of a 4-digits address number at address number window 106. The address number is composed of 3-digits channel number and 1-digit load number for indicating a particular one of the load addresses allocated to one lamp. After selecting the address number by use of the keys 82 to 84, it is requested to select one of "normal control" and "solar control". The "normal control" is provided to determine an ON-time and an OFF-time as the actuation times when the selected lamp is turned on and off, respectively. On the other hand, the "solar control" is provided to turn on and off the lamp based upon the sunrise time and/or the sunset time.

4-1-1) "Normal Control"

When this control is selected with a corresponding marking "NML" being highlighted in the display, it is enabled to set the ON-time and the OFF-time with reference to the time window 104 and with the help of the keys 82 to 84. Thereafter, the sequence proceeds to select day or days of week and/or the specific day on which the normal control is assigned. The day selection is made by pressing the up-key 82 and the down-key 84 to highlight the intended markings in a day window 107 listing a row of the first specific day 1 (SP-D1), the second specific day (SP-D2), and days of a week in a row. One or more days can be selected to be assigned to the normal control by pressing the set key 84. Based upon the data entered or the intended time schedule, the microcomputer 60 makes up a load management program for operating the lamp and stores it with the selected program number in the memory 66 to be ready for executing the program.

4-1-2) "Solar Control"

When this control is selected with a corresponding marking "ASTRO" being highlighted, it is further requested to select a control scheme from a sunset to sunrise control, a sunset to fixed-time control, and a fixed-time to sunrise control by use of the keys 82 to 84 with reference to corresponding icons for sunset, fixed-time, and sunrise arranged in a window 108. The sunset to sunrise control is provided for turning on the lamp at the sunset time and turning it off at the sunrise time. The sunset to fixed-time control is for turning on the lamp at the sunset time and turning it off at a fixed time different from the sunset time and sunrise time. The fixed-time to sunrise control is for turning on the lamp at the fixed time and turning it off at the sunrise time. The sunset time and the sunrise time are read out from the memory 66 as associated with a particular region selected from predetermined regions also stored in the memory.

In anticipation of a case where it becomes dark already before the sunset or becomes light only after a short while from the sunrise, the timer unit allows to adjust or modify the sunset time and the sunrise time. Such adjustment can be initiated by pressing the set key 84 after selecting the control scheme, and is followed by highlighting a corresponding icon, i.e., "±0" indicative of no adjustment required accompanied with icons "Earlier" indicative for moving the sunset timer earlier, and "Later" for moving it later. After deciding "Earlier" or "Later" with the use of the keys 82 to 84, it is enabled to select and determine an advancing time or delaying time by increment of one (1) minute appearing on a minute window 110 by use of the keys 82 to 84. When no adjustment is selected, the above step is skipped. Thereafter, the fixed time is selected with reference to the time window 104. Then, the sequence proceeds to select day or days of week and/or the specific day on which the solar control is assigned, which is identical to that discussed hereinbefore with reference to the "Normal Control". Based upon the data entered or the intended time schedule, the microcomputer 60 makes up a load management program and stores it with the selected program number in the memory 66.

4-2) "Group Control"

When this control is selected, a corresponding icon "G" is highlighted to enable the entry of the group address number at 106 for designating the intended group of the lamps to be turned on and off simultaneously. After designating the group, the sequence goes through the same steps starting from the selection of the control type, "Normal" or "Solar" and ending with the day selection, as discussed with reference to the "Normal Control", making up the corresponding load management program and storing it in the memory with the selected program number.

4-3) "Dimmer Control"

When this control is selected in the programming mode, a corresponding icon "DIM" is highlighted to enable the entry of the dimmer number at 106. The dimmer number designates one of the predetermined group of the lamps having the dimming capability, and is selected from sixteen (16) ones describing particular control methods which are stored in the central controller 10 for dimming the lamps of the group at different levels, or power ratios from each other. After selecting the dimmer number, the sequence goes through the same steps starting from the selection of the control type, "Normal" or "Solar" and ending with the day selection, as discussed with reference to the "Normal Control", making up the corresponding load management program and storing it in the memory with the selected program number.

4-4) "Patterned Control"

When this control is selected, a corresponding icon "P" is highlighted to enable the entry of the pattern number at 106. The pattern number designates one of the seventy-two (72) predetermined patterns stored in the central controller to specify different control methods of operating the lamps as explained hereinbefore. After selecting the pattern number, the sequence goes to a step of selecting one of "normal control", "solar control", and "repeated control". The "normal control" is provided to determine the actuation time at which the patterned control selected by the pattern number is made, while the "solar control" is provided to select the sunset time or sunrise time at which the patterned control is made. The "repeated control" is provided to determine a start time for making the patterned control, an end time for ceasing the patterned control, and an interval at which the patterned control is repeated.

4-4-1) "Normal Control"

Upon selecting this control, it is requested to enter the actuation time at the time window 104 with the use of keys 82 to 84. Thereafter, the sequence proceeds to select day or days of week and/or the specific day on which the normal control is assigned, and ending by making up the corresponding load management program and storing it in the memory with the selected program number.

4-4-2) "Solar Control"

Upon selecting this control, it is requested to determine whether the sunset time or sunrise time is assigned to make the selected patterned control with reference to the window 108. Thereafter, the adjustment of the sunset time or the sunrise time is made in the same manner as discussed hereinbefore. Then, the sequence proceeds to select day or days of week and/or the specific day on which the solar control is assigned, and ending by making up the corresponding load management program and storing it in the memory with the selected program number.

4-4-3) "Repeated Control"

Upon selecting this control, a corresponding marking "REPEAT" is highlighted in the display and it is requested to determine the start time, the end time, and the interval with reference to the time window 104. After determining these items by using keys 82 to 84, the sequence proceeds to select day or days of week and/or the specific day on which the repeated control is assigned, and ending by making up the corresponding load management program and storing it in the memory with the selected program number.

In the programming mode, it is enabled to copy the stored program for providing and storing the same program but with a different program number selected from unassigned numbers. Thus, it is easy to make the similar program for management of different lamps or different group of lamps. The copying is done by manipulating a particular combination of keys, for example, by pressing the up-key 82 and the down-key 83 simultaneously and holding them for some seconds. Further, the input section 80 is provided with a clear key 86 for clearing all the programs stored in the memory 66 to initialize the timer unit 50.

5) Special Action Mode

Now turning back to FIG. 6 illustrating the mode selection, when the special action mode is selected, a corresponding marking "SPECIAL" appears as being highlighted in the uppermost row 101 of the display 100. This mode further provides five (5) actions, namely, a first specific day switch allocation, a second specific day switch allocation, a standby setting, a region selection, and a display auto-off action, and needs to select one of these actions.

5-1, 2) Specific Day Switch Allocation

Each of the first and second specific day switch allocation action is provided for allocating the function of designating the first and second specific days to a particular switch on the side of the switch terminals 30 such that the user can designate the next day as the specific day simply by pressing the particular switch. When this action is selected, a corresponding marking at the bottom row 111 of the display 100 is highlighted and it is requested to enter the switch address of the particular switch with reference to the address number window 106. Once the switch address is entered, the microcomputer 60 is prepared for receiving the signal from the particular switch indicative of the switch being pressed. When receiving the signal, the microcomputer 60 acknowledges the next day as the specific days so that every load management program designating the specific day can apply to the next day. The microcomputer 60 is configured to cancel the above designation upon receiving the signal indicative of the switch being pressed again. It is noted that the above designation and cancellation can be made also on the side of the timer unit 50, i.e., by pressing corresponding keys 86 and 87 included in the input section 80, as shown in FIG. 2.

5-3) Standby Setting

When this setting action is selected with a corresponding marking at the bottom low 111 being highlighted, it is requested to enter a switch address assigned to a particular switch on the side of the switch terminal 30 and classified as the individual control type. Once the switch address is determined, the switch is allocated as a standby switch which deactivates the timer unit or the timer control over the lamps upon being pressed. That is, when the switch terminal 30 sends a particular control code assigned to the standby switch to the transmission line 40, the timer unit 50 acknowledges the event and invalidates its timer control. When the standby switch is pressed again, the timer unit 50 responds to resume the timer control, enabling the load management in accordance with the time schedule. Thus, the timer control by the timer unit can be activated or deactivated simply by manipulating the standby switch. In this connection, the input section 80 also includes a standby key 88 which is an alternative of the standby switch for deactivate and activating the timer control.

5-4) Region Setting

This action is provided for setting a region where the solar based timer control is intended. The timer unit 50 stores in the memory 66 a plurality of predetermined regions each having local information as to the sunrise time and the sunset time such that the user can select an optimum region from the predetermined regions by identifying one of numbers assigned to the individual regions. When the region is set, the microcomputer reads the sunset and sunrise times corresponding to the region and use the information for the solar-based timer control as discussed hereinbefore. When no corresponding region is suitable, i.e., the selection of the region is skipped, the timer unit 50 provides an additional function of requesting the entry of a longitude and a latitude of the region where the load management is intended in order to rely on correct sunset time and sunrise time for reliable control. For this purpose, the timer unit 50 is preinstalled with data table from which the sunset and sunrise times of the intended region are retrieved by identifying the longitude and the latitude thereof.

5-5) Display Auto-Off

When this action is selected, a corresponding marking at the bottom row 111 is highlighted and the timer unit 50 is set to deactivate the display 100 after the elapse of a predetermined time period, for example, 10 minutes from the last action made a the input section 80. That is, upon the action being selected, the microcomputer 60 is made ready for turning off the backlight 71 and/or the LCD driver 70 after the elapse of the predetermined time period from the last access to the input section for saving energy. However, it may be possible to keep the time windows 104 activated irrespective of such condition. In order to further save the energy, the display 100 may be configured to be kept deactivated until the timer unit itself acknowledges the presence of a user therearound. For this purpose, the timer unit 50 is provided with a human detector which generates a detection signal to the microcomputer 60 when detecting the user's presence around the timer unit. In response to the detection signal, the microcomputer 60 instructs to activate the LCD driver 70 and the backlight 71. In this connection, the input section 80 is also provided with a backlight key 89 which turns off the backlight after the elapse of a predetermined period, for example, five minutes from the last access to the input section.

Further, the input section 80 includes a summer time key 90 which validates or invalidates the summer time applicable to the time schedule defined by the timer unit. When the key 90 is pressed, the microcomputer 60, a corresponding marking in the display 100 is highlighted and the microcomputer 60 is prepared to make a summer time adjustment when the timer unit operates under the normal mode of controlling the lamps. That is, during the normal mode, the microcomputer 60 checks constantly whether the present time is within a summer time range which is indicative of a duration where the summer time is applied and is stored in the memory 66 as related to the selected region. When the present time is found to be within the summer time, the microcomputer 60 responds to advance or back the present time provided by the clock in accordance with the summer time adjustment.

Alternatively, the summer time key 90 may be linked to the microcomputer 60 such that the present time is advanced by one hour when firstly pressing the key 90 and is delayed by one hour when pressing the key again, irrespective of the present time is or not within the summer time range. Thus, the actuation time can be easily adjusted independently of the summer time range.

Now, the operation for controlling the lamps by the timer unit 50 will be discussed with reference to FIGS. 9 to 13. After the load management programs are made up as discussed in the above with reference to the programming mode, these programs are stored in the memory in a format shown in FIG. 9, for making different or the same control methods defined by the control codes over the different or the same sets of lamps at different or same day(s) at different actuation times. The control codes are predetermined in a table as shown in FIG. 10, from which it is noted that the control code "P1" designates the patterned control for operating the lamps included in the load group "L1" at its 50% power ratio or 50% dimming level. Likewise, the control code "P2", "P3", and "P4" designate patterned controls for operating the same lamps at 50%, 30%, and 0% (lamp off) powers, respectively.

Turning back to FIG. 9, each listed program is explained in the order of the program number. Program number 1 is written to make the patterned control as defined by control code P2, i.e., operate the lamps of the load group L1 at 50% power at 8:30 on each of Monday to Friday, and the second specific day. Program number 2 is to make the patterned control "P1", i.e., operate the lamps of the same group at 100% power at 9:00 on each of Monday to Friday, and the second specific day. Program number 3 is to start the patterned control "P3", i.e., operate the same lamps at 30% power at 12:00, repeat the same control at an interval of 30 minutes and end the control at 12:30 on each of Monday to Friday. Program number 4 is to make the patterned control "P1" of operating the same lamps at 100% power at 13:00 on each of Monday to Friday. Program number 5 is to make the patterned control "P2" at 18:00, repeat it at an interval of 1 hour, and end at 19:00 on each of Monday to Friday. Program number 6 is to make the patterned control "P4" of turning off the same lamps at 20:00, repeat it at an interval of one hour, and end the control at 24:00 on each of Monday to Friday. Program number 7 is to make the patterned control "P4" of turning off the lamps at 7:00, repeat at an interval of one hour, and end at 24:00 on Saturday, Sunday, and the first specific day. Program number 8 is to make the patterned control "P4" at 12:00, repeat at an interval of one hour, and end at 24:00.

Figure 11:
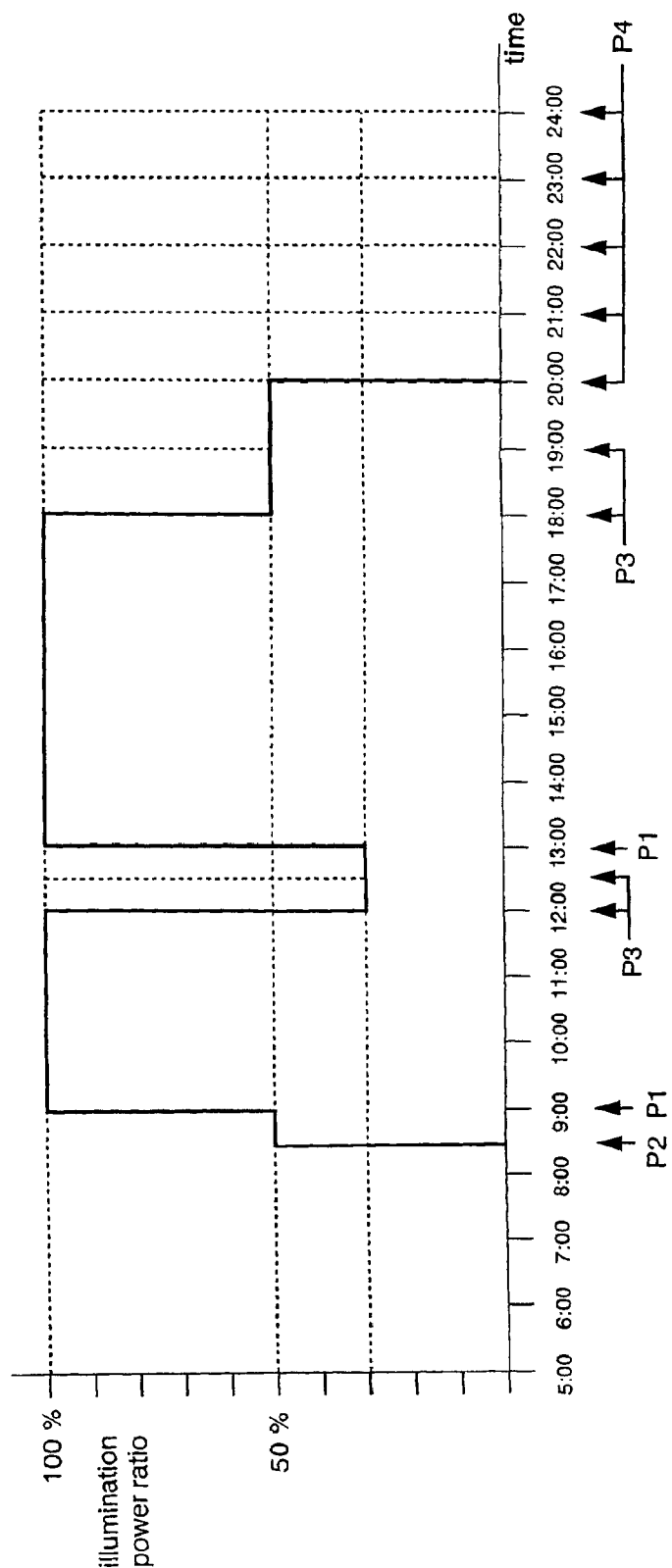
FIGS. 11 to 13 show time charts respectively showing load management schedules determined for week-days, a specific day of Saturday & Sunday, and another specific day of half-holiday, respectively.

For easy understanding of the programmed operation, an explanation is made with reference to FIG. 11 which shows a weekday's schedule executed by the above programs for operating the lamps at different powers (i.e., dimming level) with respect to the time. At 8:30, the microcomputer executes the program number 2 to turn on the lamps at 50% power according to the patterned control "P2". At 9:00, the program number 2 is executed to turn on the lamps at 100% power according to the patterned control "P1". At 12:00 when a lunch time break starts, the program number 3 is executed to turn on the lamps at 30% power according to the patterned control "P3" for saving the energy, and is repeated at 12:30. Therefore, even if someone should manipulate the corresponding switch to turn on the lamps at 100% power during 12:00 to 12:30 and leave as it is, the patterned control "P3" is repeated at 12:30 to reduce the lamp power to 30% for saving the energy. At 13:00 after the lunch time break, program number 4 is executed to operate the lamps at 100% power according to the patterned control "P1" until a closing time of 18:00, at which the patterned control "P2" is made active to reduce the lamp power to 50%. The patterned control "P2" is repeated at 19:00 so that even if someone should turn on the lamps at 100% power after 18:00 and leave as it is, the lamp power is reduced to 50% at 19:00. At 20:00, the patterned control "P4" is made active to turn off the lamps and is repeated by an interval of one hour until 24:00. Thus, even if the lamps are turned on at any time during 20:00 to 24:00, the lamp can be turned off at each time of 21:00, 22:00, 23:00, and 24:00 for saving the power.

Figure 12:
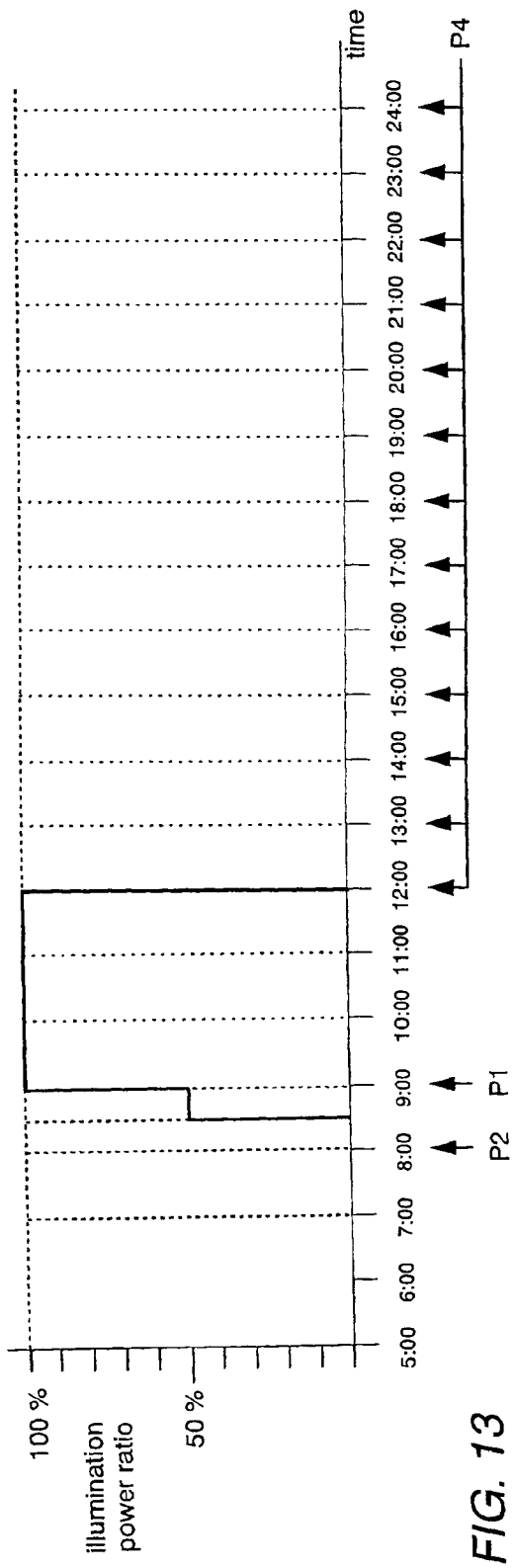
Figure 13:
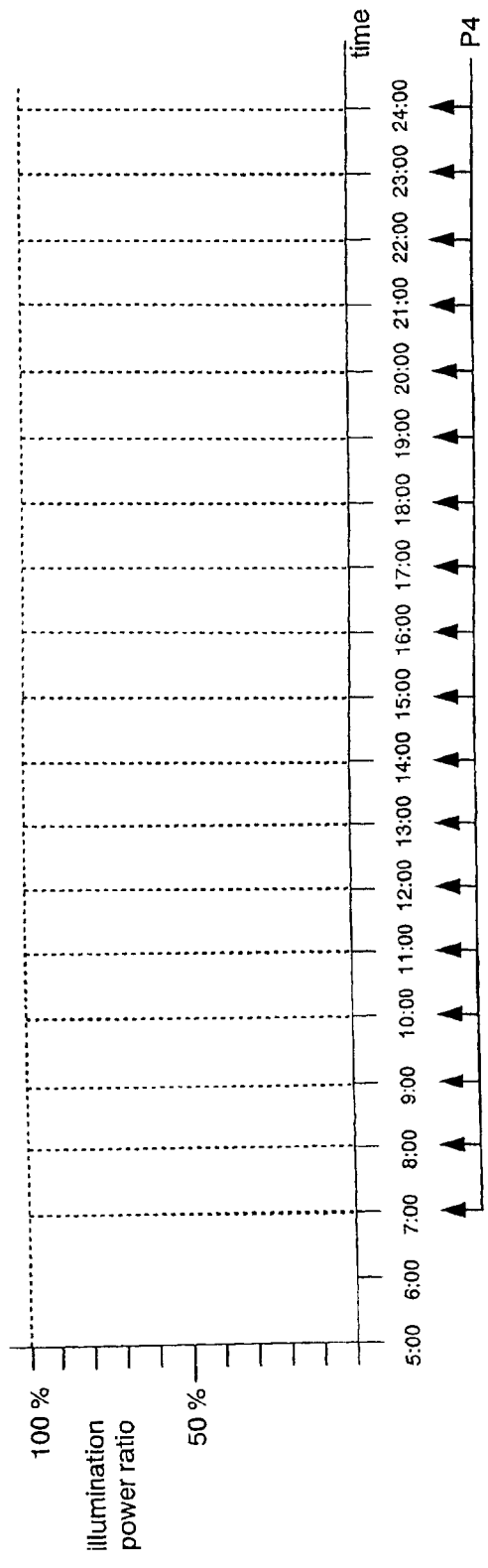

FIG. 12 shows a like schedule for the second specific day representative of a half-holiday in which the patterned controls "P2" and "P3" are made respectively at 8:30 and at 9:00. At 12:00 the patterned control "P4" is made and is repeated at one hour interval until 24:00. FIG. 13 shows a like schedule for Saturday, Sunday, and the first specific day representative of a holiday in which the patterned control "P4" is made at 7:00 and is repeated at one hour interval until 24:00.

In the meanwhile, the timer unit 50 additionally provides a simulation mode for simulating the load management program. The simulation mode is selected by pressing together a particular combination of keys, for example, the mode key 81 and the up-key 82. Upon this occurrence, the microcomputer 60 asks the entry of the program number at 105 of the display. After the program number is decided by use of the keys 82 to 84, the microcomputer 60 generates a simulation command which is processed to retrieve the actuation time from the load management program designated by the program number and temporarily sets the present time as the actuation time for executing the load management program. When more than one actuation times are prescribed in the program, the microcomputer 60 simulates the operation in the order of the actuation times. After all the actuation times are traced, the microcomputer 60 restores the present time as an actual time. With the provision of the simulation mode, it is easy to check the load management program, i.e., the control of the lamps.

The timer unit 50 is additionally equipped with a serial port (not shown) for connection with a personal computer in order to import or export a load management program from and to the computer for easy preparation and modification on the side of the personal computer. Further, the program stored in the memory 66 can be edited or rewritten on the side of the personal computer by a suitable setting made at the jumper setting section 68.

When more than one such load management systems are required such as for control of the lamps or other loads in a large scale premises with the attendant inclusion of more than one programmable timer units, it is required to synchronize the clocks of the all timer units with a correct time signal. For this purpose, the timer unit of the present invention is equipped with the time signal input terminal circuit 76 and the time signal output terminal circuit 74, as shown in FIG. 4. When more than one timer units 50 are interconnected, one of the units is set to receive a wave clock pulse as the correct time signal transmitted every one hour at the input terminal circuit 76, and to generate and send out a time signal synchronized with the wave signal to the other timer units. Upon receiving the wave clock pulse, the microcomputer 60 of the receiving timer unit 50 detects a rising edge of the signal and adjusts the clock 65 in synchronous with the wave signal and at the same time generates a pulse command for sending a synchronizing clock pulse having a width of 500 milliseconds from the output terminal circuit 74. The synchronizing clock pulse is then received at the input terminal circuit 76 of the next timer unit 50 for adjusting the internal clock 65 and causing the timer unit to transmit a like synchronizing clock pulse. In this manner, all the timer units connected in chain can be synchronized to give the correct time for reliable timer based load management control.

Figure 14:
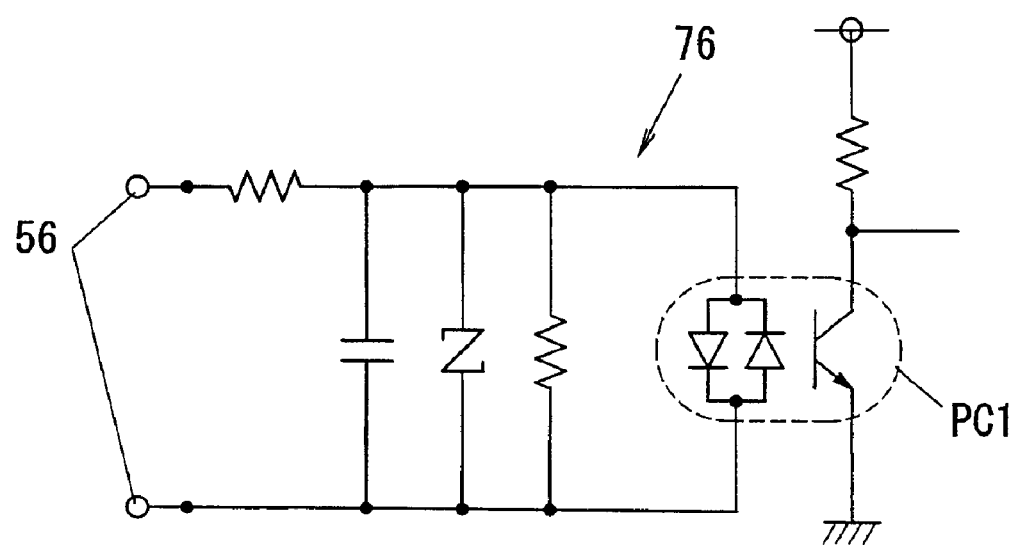
FIG. 14 is a circuit diagram of a timer signal input terminal circuit utilized in the above timer unit.
Figure 15:
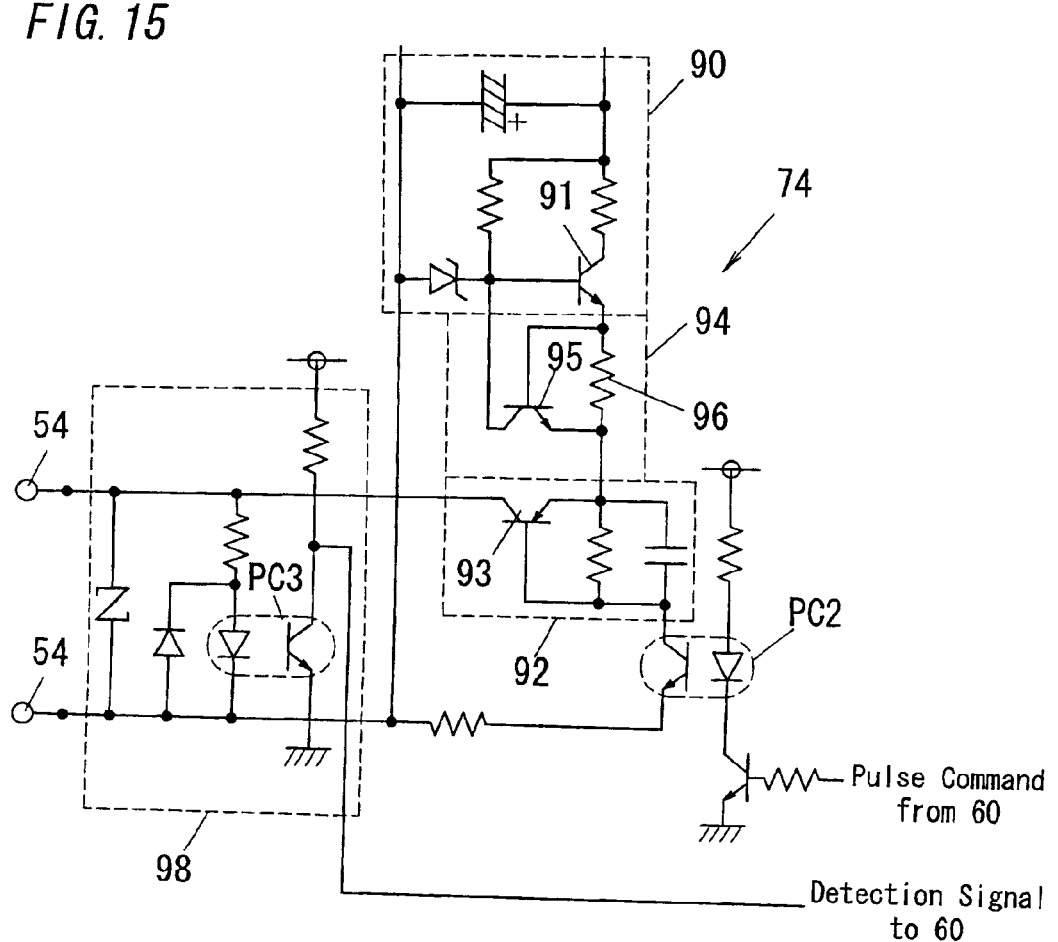
FIG. 15 is a circuit diagram of a timer signal output terminal circuit utilized in the above timer unit.

As shown in FIG 14, the time signal input terminal circuit 76 has a photo-coupler PC1 which relays the wave clock pulse or synchronizing clock pulse received at 56 to an input port of the microcomputer 60. On the other hand, the time signal output terminal circuit 74 includes, as shown in FIG. 15, a photo-coupler PC2 which is connected to an output port of microcomputer 60 to relay the pulse command for sending the synchronizing clock pulse through the terminals 54. The output terminal circuit 74 includes a constant voltage supplying circuit 90 providing a constant DC voltage across the terminals 54, a switching circuit 92 which turns on a transistor 93 in response to the photo-coupler PC2 receiving the pulse command from the microcomputer for generating and sending the synchronizing clock pulse through terminals 54. Also included in the output terminal circuit 74 is a current limiter 94 which is composed of a transistor 95 and a resistor 96 for limiting a current carrying the synchronizing clock pulse and flowing into a line connecting the terminal 54 to the terminal 56 of the next timer unit, in case the voltage supplying circuit 90 acts to flow the excess current across the line upon occurrence of the line being shorted. That is, if the voltage supplying circuit 90 would flow an excess current through the resistor 96 due to the short-circuiting of the line, the transistor 95 responds to turn on for lowering a base current to transistor 91 of the constant voltage supplying circuit 90, thereby limiting the current for circuit protection. Further, the time signal output terminal circuit 74 includes a detection circuit 98 which has a photo-coupler PC3 for detection of whether or not the synchronizing clock pulse is sent. When the clock pulse is sent, the photo-coupler PC3 is turned on to provide a low-level detection signal to an import of the microcomputer 60 such that the microcomputer 60 acts to give an indication on the display 100 whether or not the synchronizing clock pulse is successfully sent. For this purpose, the display 100 includes a corresponding marking "SYNCHRONIZE", as shown in FIG. 2, which is flushed or highlighted when clock pulse is detected to be sent.

Figure 16:
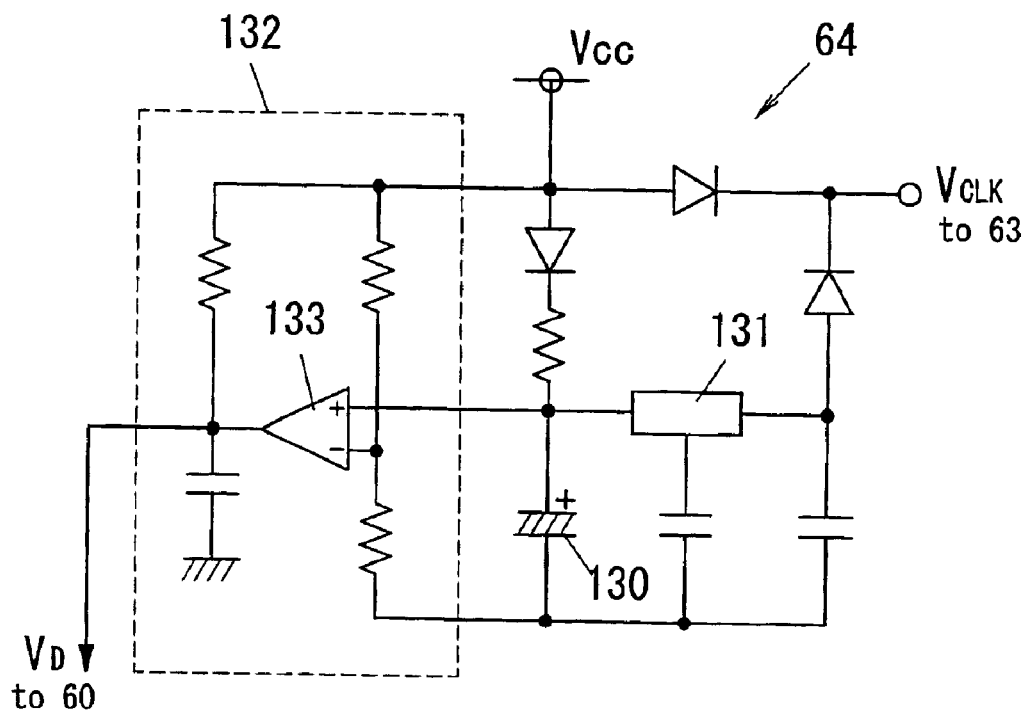
FIG. 16 is a circuit diagram of a power back-up unit utilized in the above timer unit.

As a safeguard against a possible power failure in providing the supply voltage to the power supply 63 of the timer unit 50, the timer unit 50 is equipped with the back-up circuit 64 which provides an operating voltage to the real-time clock 65. As shown in FIG 16, the back-up circuit 64 includes a capacitor 130 which is constantly charged by voltage Vcc from the power supply 63 and supplies the operating voltage VCLK through a three-terminal regulator 131. The capacitor 130 may be replaced with a rechargeable lithium battery. Included in the back-up circuit 64 is a voltage detector 132 with an operational amplifier 133 which detects a voltage across the capacitor 130 and provides the detected voltage VD to an input port to the microcomputer 60. The detected voltage is compared at the microcomputer 60 with a predetermined level in order that the microcomputer 60, when regains from the power failure, judges whether or not the real-time clock has been kept issuing the correct time signal during the power-failure. In this connection, the microcomputer 60 is programmed to save the current date and time data in the memory 66 at a regular interval so as to make the use of the data for the real-time clock 65 in case that the detected voltage is found to be less than the predetermined level when the microcomputer regains from the power failure, thereby avoiding a considerable error between the present time counted by the real-time clock and the actuate time.

Further, the microcomputer 60 is programmed to make an error handling function of locating an error in operation and give an error number at 110 on the display 100 while highlighting an error marking, indicating the contents of the error. The error number includes, for example, "01" for read/write error of the LCD driver 70, "02" for read/write error of the memory 66, "03" for rear/write error of RAM in the microcomputer, "04" for read/write error of the real-time clock 65, "05" for transmission error at the serial port, "10" for transmission error through the transmission line 40, "11" for time-out error at the interruption of the event signal, "20" for input/output error of the synchronizing wave pulse. Thus, the user can identify the cause of the error by the error number.

This application is based upon and claims the priority of Japanese Patent Application No. 2001-126762, filed in Japan on Apr. 24, 2001, and No. 2001-302786 filed in Japan on Sep. 28, 2001, the entire contents of which are expressly incorporated by reference herein.

What is claimed is:

1. A programmable timer unit for use in a remote control load management system, said system using a central controller, a switch terminal, and a load terminal that are connected with each other over a transmission line for a time-division multiplexing signal intercommunication therebetween;

said central controller storing an address table relating each of switch addresses to at least one load address, and a control table relating each of control codes to a control method for operating the load or loads, said switch terminal having at least one switch that is manipulated by a user and that is allocated with a particular one of said switch addresses, said switch terminal generating an event signal upon said switch being manipulated and transmitting it to said central controller together with said switch address and a particular one of said control codes assigned to said switch;

said central controller, in response to said event signal accompanied with said switch address and said control code, referencing said address table and said control table to obtain the corresponding load address and the corresponding control method, and to providing a control signal indicating thus obtained load address and the control method to said load terminal;

said load terminal being connected to at least one load and having a particular one of said load addresses allocated to said load, said load terminal responding to said control signal for actuating the corresponding load in a manner as designated by said control method;

said programmable timer unit being a combination switch and timer which determines anyone of said switch addresses defined in said address table and determines an actuation time at which the corresponding load is intended to be actuated in one of said control method defined in said control table, said programmable timer unit comprising:

an input section for selecting the switch address corresponding to said at least one load and for selecting a schedule specifying said actuation time and said control code for said at least one load, a programming section for making up a load management program based upon said schedule given at said input section for said at least one load;

a memory for storing said load management program;

a clock keeping time to give a present time;

a transceiver which communicates with said central controller for controlling and monitoring the load;

a processor which executes said load management program to generate the event signal and gives said control code when the present time comes coincidence with said actuation time, and transmit said event signal, said control code, and said selected switch address to said central controller, such that said central controller responds to actuate the corresponding load in accordance with said schedule.

2. The programmable timer unit as set forth in claim 1, wherein
said timer unit includes a transceiver section which is adapted to be connected to the transmission line for transmitting said event signal accompanied with said switch address and said control code to said central controller and for receiving therefrom a status signal indicative of a status of the load designated by said switch address,
said timer unit has a single casing which accommodates electronic components realizing said input section, said programming section, said memory, said clock, said processor and said transceiver section.

3. The programmable timer unit as set forth in claim 1, wherein
said memory stores a sunrise time as well as a sunset time specific to each of a plurality of predetermined regions,
said input section providing a menu for selecting one of the regions and for selecting one of the sunrise time and the sunset time as said actuation time;
said processor reading the sunrise and sunset time specific to the selected region from said memory so as to generate said event signal when the present time comes into coincident with the selected one of the sunrise and sunset times.

4. The programmable timer unit as set forth in claim 3, wherein
said input section has a means for modifying the sunrise time and the sunset times specific to each selected region.

5. The programmable timer unit as set forth in claim 1, wherein
said input section has a function of receiving a request for a summer time adjustment,
said memory stores a summer time range specifying a duration where a summer time is applied,
said processor modifying the present time provided by said clock in accordance with the summer time adjustment when the present time is within said summer time range and when the summer time adjustment is requested.

6. The programmable timer unit as set forth in claim 1, wherein
said input section includes a display for items to be selected at the entry of the schedule,
said processor having a function of deactivating the display after the elapse of a predetermined time period from the last action made at the input section.

7. The programmable timer unit as set forth in claim 1, wherein
said input section includes a display for items to be selected at the entry of said schedule.
said timer unit further including a human detector for detection of the presence of a user around the timer unit and providing a detection signal to said processor upon detection of the user,
said processor activating the display in response to the detection signal.

8. The programmable timer unit a set forth in claim 1, wherein
said input section provides a means for accepting a simulation request for simulating the load management program, selecting the load management program to be simulated, and providing a simulation command,
said processor, in response to said simulation command, retrieving said actuation time from said program and temporarily setting the present time as said actuation time for executing the load management program.

9. The programmable timer unit as set forth in claim 1, wherein
said input section provides a function of allocating the load management program to a specific day such as a holiday and a half-holiday,
said input section further including a specific day selecting key which issues an instant selection command designating the next date as the specific day,
said processor, in response to said instant selection command, modifying said load management program to include the next date where said specific day is designated for the load management.

10. The programmable timer unit as set forth in claim 1, wherein
said programmable timer unit includes
a time signal input terminal circuit for receiving a time signal being counted at an external device,
a time signal output terminal circuit for transmitting said time signal to another programmable timer unit,
a synchronous time correction means which corrects the present time in accordance with said time signal.

11. The programmable timer unit as set forth in claim 10, wherein
said programmable timer unit includes a current limiter which limits a current responsible for transmitting the time signal to said transmission line.

12. The programmable timer unit as set forth in claim 10, including
a time signal detection means which detects whether or not the time signal is transmitted from said time signal output terminal circuit, and
a display for displaying the detection result of said time signal detection means.

13. The programmable timer unit as set forth in claim 1, wherein
said clock is normally energized by a power supplied from an external power source,
said programmable timer unit including a back-up power circuit which keeps energizing said clock in the absence of the power from the external power supply,
said programmable timer unit further including a check means which checks whether or not the back-up battery provides a sufficient power for operating the clock, and warns when the sufficient power is not available.

14. The programmable timer unit as set forth in claim 1, further including
a data communication means which obtains a load management program externally prepared through said transmission line and stores it in said memory.

15. The programmable timer unit as set forth in claim 13, further including
an initializing means for erasing the load management program stored in said memory.

16. The programmable timer unit as set forth 1, further including a copy means for duplicating the load management program.

17. The programmable timer unit as set forth in claim 1, further including an error processing means which gives an error message on a display when said load management program fails to operate.

18. The programmable timer unit as set forth in claim 1, wherein said memory is a non-volatile memory.

19. A programmable timer unit for use in a remote control load management system, said system using a central controller, a switch terminal, and a load terminal that are connected with each other over a transmission line for a time-division multiplexing signal intercommunication therebetween;

said central controller storing an address table relating each of switch addresses to at least one load address, and a control table relating each of control codes to a control method for operating the load or loads, said switch terminal having at least one switch that is manipulated by a user and that is allocated with a particular one of said switch addresses, said switch terminal generating an event signal upon said switch being manipulated and transmitting it to said central controller together with said switch address and a particular one of said control codes assigned to said switch;

said central controller, in response to said event signal accompanied with said switch address and said control code, referencing said address table and said control table to obtain the corresponding load address and the corresponding control method, and to providing a control signal indicating thus obtained load address and the control method to said load terminal;

said load terminal being connected to at least one load and having a particular one of said load addresses allocated to said load, said load terminal responding to said control signal for actuating the corresponding load in a manner as designated by said control method;

said programmable timer unit being a combination switch and timer which determines anyone of said switch addresses defined in said address table and determines an actuation time at which the corresponding load is intended to be actuated in one of said control method defined in said control table, said programmable timer unit comprising:

an input section configured to select the switch address corresponding to said at least one load and configured to select a schedule specifying said actuation time and said control code for said at least one load;

a programming section configured to make up a load management program based upon said schedule given at said input section for said at least one load;

a memory configured to store said load management program;

a clock configured to keep time to give a present time;

a transceiver which is configured to communicate with said central controller for controlling and monitoring the load;

a processor configured to execute said load management program to generate the event signal and configured to give said control code when the present time comes coincidence with said actuation time, and configured to transmit said event signal, said control code, and said selected switch address to said central controller, such that said central controller responds to actuate the corresponding load in accordance with said schedule.

\* \* \* \* \*